United States Patent Office 2,705,704
Patented Apr. 5, 1955

2,705,704

RESINOUS PHENOL-ALDEHYDE DERIVATIVES

Ben Edmund Sorenson, Drexel Hill, Pa., assignor to E. I. du Pont de Nemours and Company, Wilmington, Del., a corporation of Delaware No Drawing. Application October 3, 1952,
Serial No. 313,043

7 Claims. (Cl. 260—51)

This invention relates to new resinuous compositions derived from adducts of preformed phenolaldehyde resins and compounds containing the oxirane

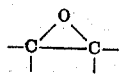

group. More specifically it relates to resins which are the reaction products of such adducts and aliphatic aldehydes together with aliphatic monohydric alcohols.

It is an object of this invention to provide resinous compositions having an empirical structure exemplified by the following formula:

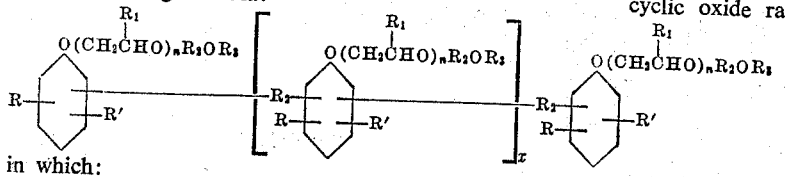

in which:

R and R' are monovalent radicals selected from the group consisting of the hydrogen, alkyl, alkenyl, alicyclic, aryl and alkaryl radicals;

$R_1$ is a monovalent radical selected from the group consisting of the hydrogen, methyl, ethyl, phenyl, —$CH_2O$ alkyl, —$CH_2O$ alkenyl and —$CH_2O$ aryl radicals. Thus

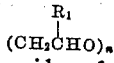

represents the divalent residue of $n$ mols of a compound which originally contained the

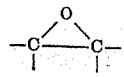

(oxirane group);

$R_2$ is a divalent radical selected from the group consisting of the $CH_2$, $CH_3CH$, $CH_3CH_2CH$ and $CH_3CH_2CH_2CH$ radicals and represents the residue of an aliphatic $C_1$–$C_4$ aldehyde. The $R_2$ radicals which form the bridges between the phenolic units may be the same as or different than the $R_2$ in the $R_2OR_3$ radical.

$R_3$ is a monovalent alkyl radical and represents the residue of an aliphatic monohydric alcohol;

$n$ is a number equal to or greater than 1 and
$x$ is an integer equal to or greater than 1.

It is to be understood that the

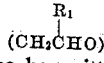

divalent group may also be written as

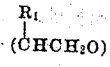

A further object is to provide a process for preparing such resinous compositions.

A still further object is to provide coating compositions containing said resinous compositions and articles coated therewith.

These and other objects, which will become apparent as the description of the invention proceeds, are accomplished by reacting (1) an adduct of a preformed phenol-aldehyde resin and a compound containing the oxirane

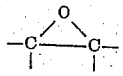

group with (2) material selected from the class consisting of ($a$) an aliphatic aldehyde together with an aliphatic monohydric alcohol and ($b$) an acetal type condensation product of said aldehyde and said alcohol.

The adducts are believed to have a structure in accordance with the following simplified empirical formula:

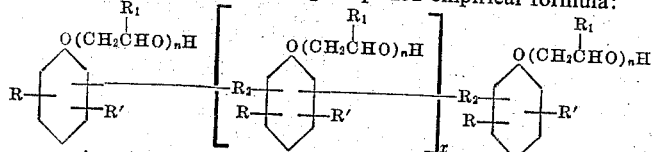

in which R, R', $R_1$ and $R_2$ are the same as previously defined. They are prepared by reacting an oxirane compound with the phenolic hydroxyl group of a preformed phenol-aldehyde resin as disclosed in the literature, e. g. U. S. Patents 2,060,410; 2,076,624; 2,454,541 and 2,598,234.

The oxirane compound may be any of the large group of compounds containing the

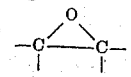

cyclic oxide radical, for instance, ethylene oxide, 1,2

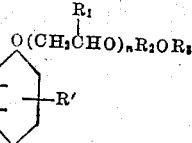

propylene oxide, 1,2 butylene oxide, styrene oxide, vinyl cyclohexene oxide, allyl glycidyl ether, phenyl glycidyl ether and epiethylin (ethyl glycidyl ether).

The phenol-aldehyde resin may be the condensation product of a large variety of phenols and aliphatic aldehydes which are well known in the phenolic resin art.

Examples of suitable phenols are phenol; alkyl substituted phenols such as cyclohexyl phenol; alkenyl substituted phenols such as butenyl phenol; aryl substituted phenols such as phenyl phenol; and alkaryl substituted phenols such as diphenylol propane. Mixtures of such phenols may be employed.

While formaldehyde or paraformaldehyde is usually employed as the aldehyde in the phenol-aldehyde condensation product, other aliphatic aldehydes may be used such as acetaldehyde and butyraldehyde.

In preparing the phenol-aldehyde resin, the ingredients are usually reacted in the presence of an acidic or alkaline catalyst until the product has become viscous to solid when cooled to room temperature.

The adduct of the phenol-aldehyde condensate and the oxirane compound is usually prepared by dissolving and reacting the ingredients at an elevated temperature in a closed vessel in the presence of a catalyst. An inert solvent such as toluene may be included.

The invention involves reacting the above described adduct with an aliphatic aldehyde and an aliphatic monohydric alcohol or with an acetal-type condensation product of said aldehyde and said alcohol, whereby all or part of the hydroxyl hydrogen atoms in the formula for the adduct are replaced by the —$R_2OR_3$ group, in which $R_2$ is the residue of said aldehyde and $R_3$ is the residue of said alcohol.

A simple example of such a reaction is the treatment of an adduct, resulting from the reaction of a preformed phenol-formaldehyde resin and ethylene oxide, with paraformaldehyde and n-butyl alcohol. In this case the —R$_2$OR$_3$ substituent group is —CH$_2$OC$_4$H$_9$. Other aldehydes such as formaldehyde, acetaldehyde or butyraldehyde may be employed, as may other alcohols such as methyl, ethyl, propyl, amyl or octyl.

Another example is the treatment of the same adduct with formal, CH$_2$(OCH$_3$)$_2$, which is an acetal-type condensation product of formaldehyde and methyl alcohol. In this case the —R$_2$OR$_3$ substituent group is

—CH$_2$OCH$_3$

The following specific examples illustrate this invention but are not intended as a limitation thereof. Unless otherwise specified, the parts are by weight.

*Example 1*

| | Parts |
|---|---|
| Adduct [1] | 279 |
| n-Butyl alcohol | 74 |
| Toluene solvent | 82 |
| Toluene sulfonic acid catalyst | 2 |
| Paraformaldehyde | 30 |

[1] The adduct was a phenolic resin prepared by the acid condensation of 7 mols of phenol and 6 mols of formaldehyde and modified with 21 mols of propylene oxide (i. e. 3 mols per phenolic hydroxyl group). A convenient abbreviated description is "phenol:formaldehyde:propylene oxide—7:6:21."

The adduct, alcohol, toluene and catalyst were placed in a vessel equipped with an agitator, a thermometer with the bulb below the liquid level and a reflux condenser having a water separator. The charge was heated to about 85° C. and agitated until a uniform solution formed, i. e. about 15 minutes. The paraformaldehyde was added and the mixture was refluxed. During a period of about 2½ hours, water was removed from the condensate and the temperature was gradually increased to about 120° C. The reaction was considered complete when no further water separated out of the distillate. The acid catalyst was neutralized by refluxing with calcium carbonate, and the charge was filtered.

The product was a relatively viscous solution of a resin having the following empirical formula:

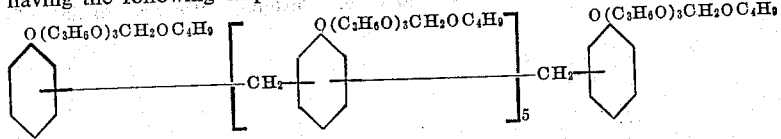

It will be seen that the above compound has the formula shown in the second paragraph of this specification, when R and R′ are hydrogen, R$_1$ is CH$_3$, R$_2$ is CH$_2$, R$_3$ is C$_4$H$_9$, $n$ is 3 and $x$ is 5.

Examples 2–12, which follow, employ the same apparatus and procedure as Example 1. In order to avoid monotonous repetition, the reactants, temperatures, substituent radicals, etc., are merely tabulated.

*Example 2*

| | Parts |
|---|---|
| Adduct (phenol:formaldehyde:propylene oxide—7:6:7.7) | 531 |
| n-Butyl alcohol | 380 |
| Toluene solvent | 240 |
| Toluene sulfonic acid catalyst | 4 |
| Paraformaldehyde | 90 |

Reaction temperature=85–127° C.
R and R′=hydrogen.
R$_1$=CH$_3$.
R$_2$=CH$_2$.
R$_3$=C$_4$H$_9$.
$n$=1.1.
$x$=5.

*Example 3*

| | Parts |
|---|---|
| Adduct (phenol:formaldehyde:propylene oxide—7:6:35) | 396 |
| n-Butyl alcohol | 156 |
| 95% sulfuric acid | 1 |
| 50% formaldehyde (aqueous) | 60 |

Reaction temperature=85–135° C.
R and R′=hydrogen.
R$_1$=CH$_3$.
R$_2$=CH$_2$.
R$_3$=C$_4$H$_9$.
$n$=5.
$x$=5.

*Example 4*

| | Parts |
|---|---|
| Adduct (phenol:formaldehyde:propylene oxide—4:3:12) | 270 |
| n-Butyl alcohol | 74 |
| Toluene solvent | 82 |
| Toluene sulfonic acid catalyst | 2 |
| Paraformaldehyde | 24 |

Reaction temperature=85–120° C.
R and R′=hydrogen.
R and R′=hydrogen.
R$_1$=CH$_3$.
R$_2$=CH$_2$.
R$_3$=C$_4$H$_9$.
$n$=3.
$x$=2.

*Example 5*

| | Parts |
|---|---|
| Adduct (phenol:formaldehyde:ethylene oxide—7:6:10.5) | 259 |
| Isobutyl alcohol | 111 |
| Toluene solvent | 109 |
| Toluene sulfonic acid catalyst | 3 |
| Paraformaldehyde | 45 |

Reaction temperature=85–112° C.
R and R′=hydrogen.
R$_1$=hydrogen.
R$_2$=CH$_2$.
R$_3$=C$_4$H$_9$.
$n$=1.5.
$x$=5.

*Example 6*

| | Parts |
|---|---|
| Adduct (phenol:formaldehyde:styrene oxide—7:6:9.31) | 270 |
| n-Butyl alcohol | 120 |
| Toluene solvent | 120 |
| Toluene sulfonic acid catalyst | 3 |
| Paraformaldehyde | 30 |

Reaction temperature=85–122° C.
R and R′=hydrogen.
R$_1$=C$_6$H$_5$.
R$_2$=CH$_2$.
R$_3$=C$_4$H$_9$.
$n$=1.33.
$x$=5.

*Example 7*

| | Parts |
|---|---|
| Adduct (phenol:formaldehyde:allyl glycidyl ether—7:6:8.75) | 494 |
| n-Butyl alcohol | 218 |
| Toluene solvent | 250 |
| Toluene sulfonic acid catalyst | 4 |
| Paraformaldehyde | 30 |

Reaction temperature=85–126° C.
R and R′=hydrogen.
R$_1$=CH$_2$OCH$_2$CH=CH$_2$.
R$_2$=CH$_2$.
R$_3$=C$_4$H$_9$.
$n$=1.25.
$x$=5.

*Example 8*

| | Parts |
|---|---|
| Adduct (phenol:formaldehyde:phenyl glycidyl ether—7:6:7.7) | 217 |

| | Parts |
|---|---|
| Isobutyl alcohol | 168 |
| Toluene solvent | 96 |
| Toluene sulfonic acid catalyst | 0.8 |
| Paraformaldehyde | 38.0 |

Reaction temperature=85–131° C.
R and R'=hydrogen.
$R_1=CH_2OC_6H_5$.
$R_2=CH_2$.
$R_3=C_4H_9$.
$n=1.1$.
$x=5$.

Example 9

| | Parts |
|---|---|
| Adduct (phenol:formaldehyde:propylene oxide—7:6:10.5) | 192 |
| Formal $CH_2(OCH_3)_2$ | 228 |
| Toluene sulfonic acid catalyst | 3 |

Reaction temperature=40–45° C.
R and R'=hydrogen.
$R_1=CH_3$.
$R_2=CH_2$.
$R_3=CH_3$.
$n=1.5$.
$x=5$.

Methyl alcohol was the by-product of the reaction rather than water as in previous examples. When the reaction was complete, 192 parts of toluene were added and the temperature was raised to about 115° C. to distill off the unreacted formal, yielding a toluene solution of the resin.

Example 10

| | Parts |
|---|---|
| Adduct (phenol:formaldehyde:propylene oxide—7:6:7.7) | 253 |
| Diethoxymethane $CH_2(OC_2H_5)_2$ | 187 |
| Toluene solvent | 120 |
| Toluene sulfonic acid catalyst | 3 |

Reaction temperature=80–100° C.
R and R'=hydrogen.
$R_1=CH_3$.
$R_2=CH_2$.
$R_3=C_2H_5$.
$n=1.1$.
$x=5$.

Ethyl alcohol was the by-product of the reaction rather than water as in Examples 1–8.

Example 11

| | Parts |
|---|---|
| Adduct (paratertiary butyl phenol:formaldehyde:ethylene oxide—10:9:12) | 214 |
| n-Butyl alcohol | 111 |
| Toluene sulfonic acid catalyst | 1 |
| Paraformaldehyde | 36 |

Reaction temperature=85–133° C.
R=hydrogen.
$R'=(CH_3)_3C$.
$R_1$=hydrogen.
$R_2=CH_2$.
$R_3=C_4H_9$.
$n=1.2$.
$x=8$.

Example 12

| | Parts |
|---|---|
| Adduct (ortho cresol:formaldehyde:propylene oxide—10:10:12) | 228 |
| n-Butyl alcohol | 202 |
| Toluene solvent | 96 |
| Toluene sulfonic acid catalyst | 2.4 |
| Paraformaldehyde | 43 |

Reaction temperature=85–127° C.
R=hydrogen.
$R'=CH_3$.
$R_1=CH_3$.
$R_2=CH_2$.
$R_3=C_4H_9$.
$n=1.2$.

$x$=approximately 15 (estimated from solution viscosity compared with similar resins of known composition).

While the examples employ a wide variety of ingredients, it is obvious that only a small proportion of the possible combinations within the scope of this invention has been illustrated. For instance, other phenol-aldehyde resins, oxirane compounds, alcohols and aldehydes, which have been previously disclosed, may be used. Furthermore, the invention is not limited to employing single members of these groups in a given product, since mixtures of two or more members may be used when desirable. Also other acid catalysts, such as benzene disulfonic acid, phosphoric acid and hydrochloric acid, and other solvents, such as xylene, naphtha, mineral spirits, ethers, esters, alcohols, or mixtures thereof, may be used.

The resinous products of this invention are particularly useful as coating compositions when used alone, in admixture with other film-forming materials, such as urea formaldehyde resins, melamine formaldehyde resins, oil modified alkyd resins, and natural gums, or in admixture with finely divided pigments such as titanium dioxide, iron oxides, iron blues, lead or zinc chromates and organic pigments. The coating compositions may be applied by any conventional method such as dipping, brushing or spraying.

The following examples illustrate such uses:

Example 13

The product of Example 1 was applied to a steel panel by dipping, and the coated panel was baked for 30 minutes at 400° F. The coating was hard, glossy, and insoluble in toluene. The panel was exposed outdoors for several months during which the coating protected the metal from rusting.

Panels coated similarly with the products of Examples 2–12 showed that these products also protected steel from rusting.

In general, the neutralized products of this invention require relatively high baking temperatures to convert them to the insoluble (cured) state. However, if a baking catalyst is incorporated in the composition prior to application, low baking temperatures may be employed, such as 120–150° F., which make these products useful for coating wooden furniture and the like. The baking catalyst may be, for instance, octyl acid phosphate, benzene sulfonic acid or, if so desired, residual acid catalyst purposely retained in the product by not neutralizing or only partially neutralizing the catalyst present during preparation.

Example 14

| | Parts |
|---|---|
| Titanium dioxide pigment | 180 |
| Urea-formaldehyde resin[1] | 75 |
| Product of Example 4 (53% resin) | 339 |
| Xylene | 15 |
| n-Butyl alcohol | 20 |

[1] 60% solution, in n-butyl alcohol, of a urea-formaldehyde butyl alcohol resin.

A pigmented enamel having the above formula was prepared by grinding the ingredients in conventional paint grinding apparatus until the pigment was finely divided and uniformly dispersed in the mixed resin solutions.

The resulting enamel was thinned with toluene to a suitable consistency and was sprayed on an aluminum panel which was baked for 30 minutes at 300° F. The coating was hard, glossy and relatively flexible and compared favoraby in simulated service tests with a conventional coating containing titanium dioxide, urea-formaldehyde resin and oil-modified alkyd resin.

Coating compositions may also be made from resinous materials prepared by heating a product of Examples 1—12 with another resinous film-forming material, preferably under reflux distillation conditions, instead of by merely mixing the cold solutions.

The preferred products of this invention are those in which substantially all of the hydroxyl hydrogen atoms of the adduct are replaced by the $R_2OR_3$ radical; however, useful products may be prepared by replacing only a portion of said hydrogen atoms.

Although any aliphatic $C_1$–$C_4$ aldehyde may be used in the practice of this invention to produce useful resins, it is preferred to use formaldehyde or paraformaldehyde for economic reasons. Also, for economic reasons, the preferred phenols are phenol, tertiary butyl phenol and cresol, the preferred oxirane compounds are ethylene oxide and propylene oxide, and the preferred monohydric alcohols are methyl, ethyl, propyl and butyl alcohol.

The empirical formula for the products of this invention, which is shown in the second paragraph of this specification, discloses an average of 1 or more mols of oxide per phenolic hydroxyl group, i. e. $n=1$ or greater. The preferred range is 1–5 because values greater than about 5 represent products having an undesirable sensitivity to water.

The empirical formula also discloses 1 or more recurrent structural units within the brackets; i. e. $x=1$ or greater. The preferred range is 1–15 because values greater than about 15 represent products having such a high molecular weight that they are insoluble or difficultly soluble in ordinary solvents, or solutions thereof are more viscous than can be handled conveniently.

The products of this invention are useful as coating compositions for both flexible and rigid surfaces, adhesives, molding compounds, emulsifiers, plasticizers, laminating materials and as intermediates for further chemical processing.

It is apparent that many widely different embodiments of this invention may be made without departing from the spirit and scope thereof and, therefore, it is not intended to be limited except as indicated in the appended claims.

I claim:
1. A resinous composition having the empirical formula

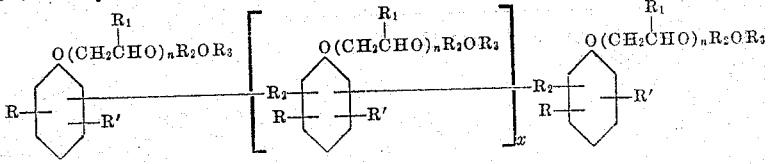

in which:
R and R' are monovalent radicals selected from the group consisting of the hydrogen, cyclohexyl, alkyl, alkenyl, aryl and alkaryl radicals;
$R_1$ is a monovalent radical selected from the group consisting of the hydrogen, methyl, ethyl, phenyl, —$CH_2O$ alkyl, —$CH_2O$ alkenyl and —$CH_2O$ aryl radicals;
$R_2$ is a divalent radical selected from the group consisting of the $CH_2$ $CH_3CH$, $CH_3CH_2CH$ and $CH_3CH_2CH_2CH$ radicals and represents the residue of an aliphatic $C_1$—$C_4$ aldehyde;
$R_3$ is a monovalent alkyl radical and represents the residue of an aliphatic monohydric alcohol;
$n$ is a number equal to at least 1 and
$x$ is an integer equal to at least 1.
2. The product of claim 1 in which $n$ is 1–5.
3. The product of claim 1 in which $x$ is 1–15.
4. A coating composition comprising the product of claim 1.
5. A coating composition comprising the product of claim 1 and another resinous film-forming material.
6. A coating composition comprising the product of claim 1 and finely divided pigment.
7. An article coated with a composition comprising the product of claim 1.

References Cited in the file of this patent

FOREIGN PATENTS

| | | |
|---|---|---|
| 434,903 | Italy | May 4, 1948 |
| 443,195 | Italy | Dec. 10, 1948 |